June 28, 1955  J. JONAS  2,711,842
VAPOR PURGING SYSTEM

Filed Nov. 18, 1952  2 Sheets—Sheet 1

INVENTOR:
Julius Jonas

His Patent Attorney

June 28, 1955 J. JONAS 2,711,842
VAPOR PURGING SYSTEM
Filed Nov. 18, 1952 2 Sheets-Sheet 2

INVENTOR:
Julius Jonas
His Patent Attorney

United States Patent Office 2,711,842
Patented June 28, 1955

2,711,842

VAPOR PURGING SYSTEM

Julius Jonas, Los Angeles, Calif., assignor to Northrop Aircraft, Inc., Hawthorne, Calif., a corporation of California Application November 18, 1952, Serial No. 321,261

6 Claims. (Cl. 220—88)

This invention relates to means for inerting the vapor space within a fuel tank and more particularly to inerting the vapor space within an engine fuel tank associated with an airplane used in military theaters of operation, thereby preventing the formation of gaseous explosive mixtures which might be ignited by combat fire or accidental sparking.

Current methods employed for inerting the vapor space within airplane fuel tanks consists of supplying an inert gas thereto. An inert gas such as nitrogen may be used which is supplied from pressurized containers or air may be used from which the oxygen has been removed by the process of combustion. Efforts have also been made to atomize fuel into the vapor space thereby rendering an overly rich gaseous mixture therein which is relatively noninflammable.

While the first two methods mentioned above are generally accepted as satisfactory they require additional equipment which is extremely objectional in airplane design from a space and weight standpoint. The second method has not proved successful due to the difficulties encountered in accomplishing vaporization by fuel atomization or similar means.

One object of the present invention is to provide efficient and economical means for inerting the vapor space within a fuel tank by heating a portion of the fuel to its vaporizing point thereby supplying an overly rich gaseous mixture therein.

Another object of the present invention is to provide means for inerting the vapor space within a fuel tank which is especially adapted for use in connection with airplanes from a space and weight standpoint.

Briefly, one preferred embodiment, of the present invention, includes an electrical heating element which is positioned within an auxiliary tank or compartment secured to a lowermost portion of an airplane engine's fuel tank when the latter is in its normal position. Engine fuel flows into the auxiliary tank where it is heated intermittently to provide fuel vapor. The fuel vapor flows to the fuel tank where it provides an overly rich gaseous mixture which is less apt to become ignited by combat fire or accidental sparking. The heating cycle may be controlled manually or by automatic control means, in either event the periods during which the fuel is heated is controlled by vapor pressures occurring within the engine fuel tank or a combination of pressures within the tank and atmospheric pressures.

The heat input required to maintain a predetermined amount of vapor in an engine fuel tank varies in accordance with several factors, for example, rate of fuel flow from the engine fuel tank, temperature of fuel within the tank, and pressures exerted on the tank at various altitudes. One of the above factors will prove critical, that is it will represent an extreme condition determining the maximum heat input if a predetermined amount of vapor is to be maintained in the fuel tank at all times. Accordingly, the heating element will be energized, either manually or automatically, as a minimum vapor pressure is reached in the engine fuel tank, the minimum vapor pressure being selected so that a predetermined quantity of vapor will be maintained in said tank under an extreme condition as referred to above.

The invention may be more fully understood by reference to the accompanying drawings wherein.

Figure 1:
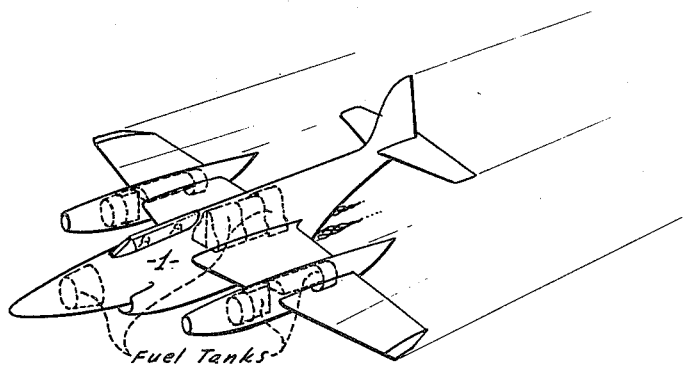
Figure 1 is a perspective view of an airplane having engine fuel tanks equipped with means for inerting the vapor space therein, as disclosed in the present invention.

Referring first to Figure 1, for a detailed description of the present invention, a jet driven airplane 1 is equipped with a plurality of interconnected engine fuel tanks.

Figure 2:
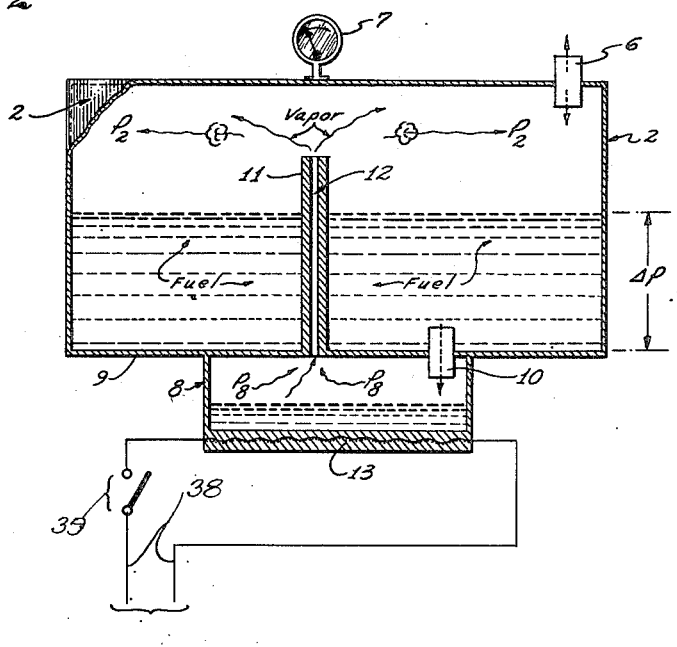
Figure 2 is a diagrammatic view of one of the engine fuel tanks shown in Figure 1 showing one preferred embodiment of the present invention.

In one embodiment of the present invention, as shown in Figure 2, an engine fuel tank 2 is shown in its normal position, which may be any one of fuel tanks shown in Figure 1. The fuel tank 2 is provided with a filler opening and a conventional fluid tight closure element (not shown) which communicates with the engine fuel line. Tank 2 is also provided with a two way pressure relief valve 6 which permits ambient air to flow into tank 2 and vapor to escape therefrom should the differential in pressure inside and outside of the tank exceed maximum allowable limits. Gauge 7 indicates the vapor pressure in tank 2 at any given time. An auxiliary fluid tight fuel tank 8 is secured to the bottom 9 of tank 2 in such a manner that the bottom of tank 2 serves as the top of tank 8. Tanks 2 and 8 communicate with each other by means of a check valve 10 and a vertically positioned conduit 11, the latter extending from a position in the bottom of tank 2, which is common with tank 8, to a point adjacent the top of tank 2. Central bore 12 of conduit 11 is relatively small so that a pressure drop will occur as fuel vapor flows therethrough. Check valve 10 is constructed to allow fuel to flow from tank 2 to tank 8 when the pressure in tank 2 is equal to or exceeds that in tank 8 as presently described. An electrical heating element 13, positioned in the bottom of tank 8, may be energized by an electric circuit 38 controlled by a manually operated switch 39.

Throughout the disclosure of the various embodiments the vapor pressure in tank 2 is referred to as $P_2$, the vapor pressure in tank 8 as $P_8$, and the fuel head in tank 2 as $\Delta P$.

In operation engine fuel is supplied to tank 2 to any desired level, as indicated by $\Delta P$. Check valve 10 allows fuel from tank 2 to flow into auxiliary tank 8 at any time when $P_2$ plus $\Delta P$ equals or exceeds $P_8$, accordingly as fuel is supplied to tank 2 the auxiliary tank is also filled. As the heating element 13 is first energized, fuel contained in tank 8 is heated until it reaches its boiling point, at which time a portion of the fuel is vaporized. Vapor pressure in auxiliary tank 8 causes check valve 10 to close precluding the flow of fuel or vapor therethrough. Vapor formed in the auxiliary tank flows through restricted bore 12 with an accompanying pressure drop. As vapor continues to flow into tank 2 pressure $P_2$ increases until it reaches a desired maximum amount, as indicated by gauge 7, at which time the heating element 13 is de-energized. With the heating element de-energized pressure $P_2$ will decrease due to temperature changes and fuel flow from tank 2. As the pressure $P_2$ reaches a predetermined minimum, heating element 13 is again energized and the above operation repeated.

During the heating operation described above the pressure $P_2$ plus the fluid head $\Delta P$ becomes equal to pressure $P_3$ at which time check valve 10 will open to permit additional fuel to enter tank 8 replacing fuel which has been vaporized.

The heating element 13 is energized and de-energized so that vapor pressure $P_2$ is maintained between a maximum and minimum pressure, respectively. Maximum and minimum pressure determine the periods during which the heating element is energized and are selected so that a predetermined amount of vapor will be present in the fuel tank even under extreme conditions as referred to above.

Figure 3:
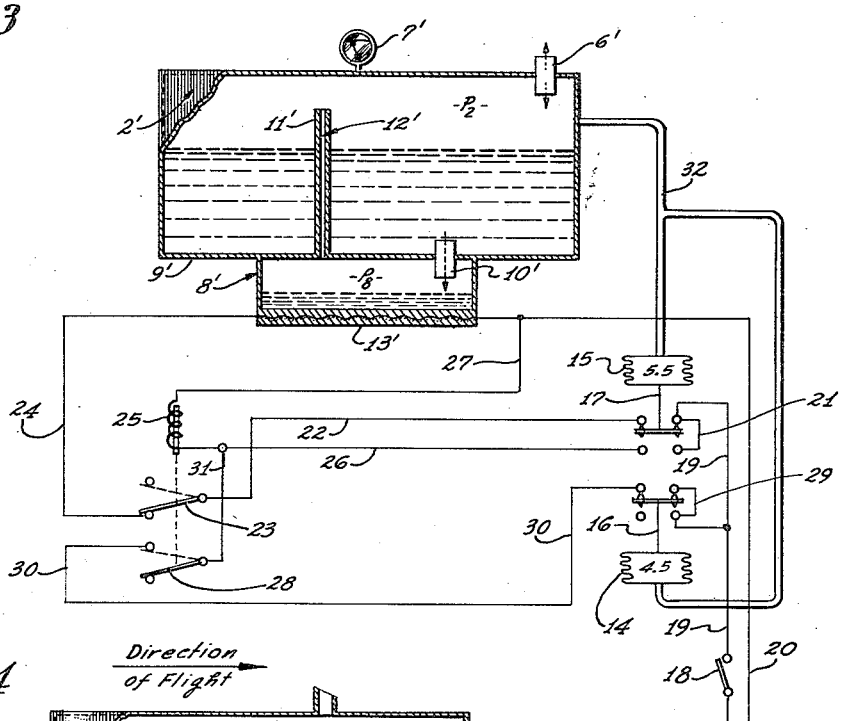
Figure 3 is a diagrammatic view similar to Figure 2, showing another preferred embodiment of the present invention.

The modification shown in Figure 3 is similar to that shown in Figure 2 with the addition of automatic control means for regulating the interval and period during which heating element 13' is energized.

The automatic control means, referred to above, functions to maintain vapor pressure $P_2$ between a minimum and maximum of 4.5 to 5.5 p. s. i., respectively, by energizing and de-energizing heating element 13'. These limits are for illustrative purposes only and in actual operating conditions would be selected to maintain a predetermined quantity of vapor in tank 2' under any extreme condition.

The automatic control means comprises a pair of aneroid pressure bellows 14 and 15 each communicating with the vapor space in tank 2' by means of a conduit 32. Bellows 14 and 15 reach their fully extended positions as pressure $P_2$ equals 4.5 and 5.5 p. s. i., respectively. Switch elements 16 and 17 associated with bellows 14 and 15 move between electrical contacts, as the bellows expand and contract, to energize and de-energize heating element 13' by means of an electrical circuit to be described.

Heating element 13' is first energized by manually closing switch 18 in positive power line 19. The heating element is now energized by the following circuit: line 19, switch 17 (up position), connector 22, switch 23 (down position), connector 24 and return line 20. Heating element 13' now vaporizes fuel in auxiliary tank 8' which flows into the vapor space in tank 2' via restricted bore 12'. As vapor pressure $P_2$ reaches 4.5 p. s. i. gauge, bellows 14 is extended and upon reaching a pressure of 5.5 p. s. i. bellows 15 is extended. The circuit to heating element 13' is now de-energized and a circuit to solenoid 25 is energized as follows: line 19, connector 21, switch 17 (down position), connectors 26, 27 and return line 20. Energized solenoid 25 moves switches 23 and 28 to their "up" position as indicated by dotted lines in Figure 3. With switch 28 in its "up" position a second circuit defined by line 19, connectors 29, switch 16 (up position), connector 30, switch 28 (up position) connectors 31, 27 and return line 20 also energizes solenoid 25. As vapor pressure $P_2$ falls below 5.5 p. s. i. bellows 15 contracts and at a pressure of 4.5 p. s. i. bellows 14 contracts, and solenoid 25 is de-energized. Switches 23 and 28 are spring urged to their original "down" position and the cycle described above repeats. The automatic control means disclosed above energizes heating element 13' as pressure $P_2$ increases from 4.5 to 5.5 p. s. i. and de-energizes the element as pressure $P_2$ decreases from 5.5 to 4.5 p. s. i.

Figure 4:
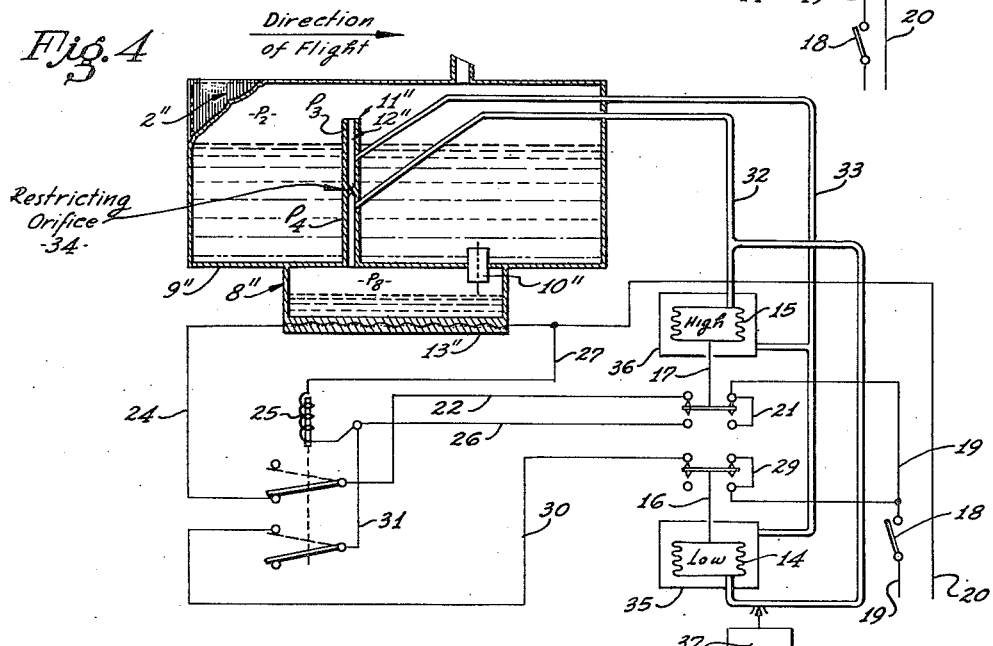
Figure 4 is a diagrammatic view similar to Figure 2, showing still another preferred embodiment of the present invention.

The modification shown in Figure 4 is similar to that shown in Figure 3, however, in Figure 4 the tank 2" is vented to ambient atmosphere and the automatic means is responsive to differences in pressure occurring in the bore 12" of conduit 11". The same numerals accompanied by primes are used to identify identical parts as shown in Figures 2 and 3.

In this embodiment the bore 12" is relatively large, a restricting orifice 34 being positioned in the bore at approximately its mid point, at which point a pressure drop occurs as vapor flows therethrough. The pressures occurring above and below orifice 34 are referred to in this disclosure as $P_3$ and $P_4$, respectively. Sealed chambers 35 and 36 enclose bellows 14 and 15 respectively and each chamber communicates with the central bore of conduit 11" above orifice 34, by means of conduit 33, therefore they are subject to pressure $P_3$. The interior of bellows 14 and 15 communicate with bore 12" below orifice 34, by means of conduit 32 and are, therefore, subject to pressure $P_4$.

Bellows 14 is calibrated to expand when the differential in pressure between $P_3$ and $P_4$ is relatively low, accordingly bellows 14 will be referred to as a "low" pressure bellows. Bellows 15 expands at a greater differential pressure between $P_3$ and $P_4$ and is referred to as a "high" pressure bellows. As is the case in connection with the modification shown in Figure 3, the differential in pressures between $P_3$ and $P_4$ at which bellows 14 and 15 expand are selected so that the heating element 13 will be energized at intervals frequent enough to maintain sufficient vapor in tank 2 under extreme conditions.

The automatic control system in connection with this modification is the same as that disclosed in connection with the modification shown in Figure 3; in as much as it functions in a similar manner a detailed description is not deemed necessary. In the present embodiment, under normal operating conditions, the heating element 13" is energized as the differential in pressure between $P_3$ and $P_4$ increases from a "low" to a "high" pressure and is de-energized as the differential in pressure between $P_3$ and $P_4$ decreases from a "high" to a "low."

In the present embodiment a dive sensitive bleeder valve 37 is shown in connection with conduit 32. Should the tank suddenly be subjected to an increased atmospheric pressure, due to the plane with which it is associated driving from a high to a low altitude, vapor in tank 2" will be condensed, accordingly additional vapor is required if a predetermined quantity of purging vapor is to be maintained in the tank 2". Under the above conditions valve 37 will open allowing vapor confined in bellows 14 and 15 to escape to the atmosphere, the bellows will immediately contract and heating element 13" will be energized to supply additional vapor to tank 2".

From the above description it is apparent there is provided a vapor purging system for fuel tanks capable of achieving the above stated objects. While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Apparatus for inerting the vapor space within a combustible liquid fuel container to effectively prevent the formation of an explosive mixture therein comprising, main and auxiliary containers adapted to contain a combustible liquid fuel, said containers being positioned with respect to each other so that said auxiliary container is normally located below said main container, the fuel capacity of said auxiliary container being small as compared with the fuel capacity of said main container, conduit and valve means adapted to alternately allow and arrest fuel flow from said main to said auxiliary container a heating element positioned in said auxiliary container, a source of power for heating said heating element, with said containers in their said normal position a conduit extending from the top of said auxiliary tank to a point inside and adjacent the top of said main container to provide a fluid flow path between said containers, and means for controlling the flow of power to said heating element whereby a portion of a fuel when in said auxiliary container is vaporized and flows to said main container through said conduit to provide a predetermined quantity of vaporized fuel therein.

2. Means for inerting the vapor space within a liquid fuel container as set forth in claim 1, in which the means for controlling the flow of power to said heating element is responsive to vapor pressure which will occur within said main container during the operation of said apparatus.

3. Means for inerting the vapor space within a liquid fuel container as set forth in claim 2, in which said means for controlling the flow of power to said heating element comprises automatic control means responsive to at least one vapor pressure occurring within said main container during the operation of said apparatus.

4. Means for inerting the vapor space within a liquid fuel container as set forth in claim 3 in which said automatic control means is responsive to a single vapor pressure occurring within said main container during the operation of said apparatus.

5. Means for inerting the vapor space within a liquid fuel container as set forth in claim 3 in which said automatic control means is responsive to a plurality of vapor pressures occurring within said main container during the operation of said apparatus.

6. Apparatus for inerting the vapor space within a liquid fuel container to effectively prevent the formation of an explosive mixture therein comprising; main and auxiliary liquid fuel containers, the bottom of said main container forming the top of said auxiliary container when said containers are in a normal position, a heating element positioned in said auxiliary container, a source of power for heating said element, with said containers in their normal position a conduit extending from the top of said auxiliary container to a point inside and adjacent the top of said main container to provide a fluid flow path therebetween, a restricted flow orifice in said conduit providing a pressure drop in fluid flowing therethrough, the fuel capacity of said auxiliary container being small as compared with the fuel capacity of said main tank, conduit and valve means adapted to allow fuel flow from said main to said auxiliary container and automatic control means responsive to fluid pressures occurring in said conduit upstream and down stream with respect to said orifice for controlling the power input to said heating element whereby a portion of said liquid in the auxiliary container is vaporized and flows to the said main container to provide a predetermined quantity of overly rich gaseous mixture therein.

References Cited in the file of this patent

UNITED STATES PATENTS

| | | |
|---|---|---|
| 2,153,555 | Gallery | Apr. 11, 1939 |
| 2,234,407 | Hoagland | Mar. 11, 1941 |
| 2,338,044 | Lanser | Dec. 28, 1943 |
| 2,515,835 | Preston | July 18, 1950 |
| 2,586,839 | Mapes | Feb. 26, 1952 |

FOREIGN PATENTS

| | | |
|---|---|---|
| 470,624 | Canada | Jan. 9, 1951 |